United States Patent [19]

Akiyama et al.

[11] 4,440,703
[45] Apr. 3, 1984

[54] PROCESS FOR PRODUCING FOAMED AND MOLDED ARTICLE OF POLYPROPYLENE RESIN

[75] Inventors: Hiroyuki Akiyama, Hiratsuka; Kuninori Hirosawa, Isehara; Hideki Kuwabara, Hatano, all of Japan

[73] Assignee: Japan Styrene Paper Corporation, Tokyo, Japan

[21] Appl. No.: 405,027

[22] Filed: Aug. 4, 1982

[30] Foreign Application Priority Data

Aug. 5, 1981 [JP] Japan .................................. 56-122717

[51] Int. Cl.$^3$ .............................................. B29D 27/00
[52] U.S. Cl. ........................................ 264/50; 264/53; 264/DIG. 5; 264/DIG. 15; 264/DIG. 16
[58] Field of Search ........ 264/DIG. 16, 50, DIG. 15, 264/53, DIG. 5

[56] References Cited

U.S. PATENT DOCUMENTS

| | | | |
|---|---|---|---|
| 2,768,407 | 10/1956 | Lindemann | 264/50 |
| 3,126,432 | 3/1964 | Schuur | 264/DIG. 15 |
| 3,250,730 | 5/1966 | Palmer | 264/DIG. 16 |
| 3,776,989 | 12/1973 | Annis, Jr. et al. | 264/DIG. 16 |
| 3,793,415 | 2/1974 | Smith | 264/DIG. 16 |
| 3,876,494 | 4/1975 | Ogawa et al. | 264/DIG. 16 |
| 4,150,077 | 4/1979 | Slocumb | 264/DIG. 15 |
| 4,275,023 | 6/1981 | Shimizu et al. | 264/50 |

Primary Examiner—Philip E. Anderson
Attorney, Agent, or Firm—Sherman & Shalloway

[57] ABSTRACT

A process for producing a foamed and molded article of a polypropylene resin, which comprises pressurizing preliminarily-foamed particles of an ethylene/propylene copolymer having a melt index value of from 0.1 to 25, a latent heat of crystallization of not more than 28 cal/g and an ethylene content of from 1 to 30% by weight as a base resin with an inorganic gas or a gaseous mixture of the inorganic gas and a volatile blowing agent thereby to impart an elevated pressure to the inside of said particles, thereafter filling said particles in a mold capable of enclosing the particles but allowing escape of gases therefrom, and then heating said particles to expand them to the configuration of the mold.

2 Claims, 2 Drawing Figures

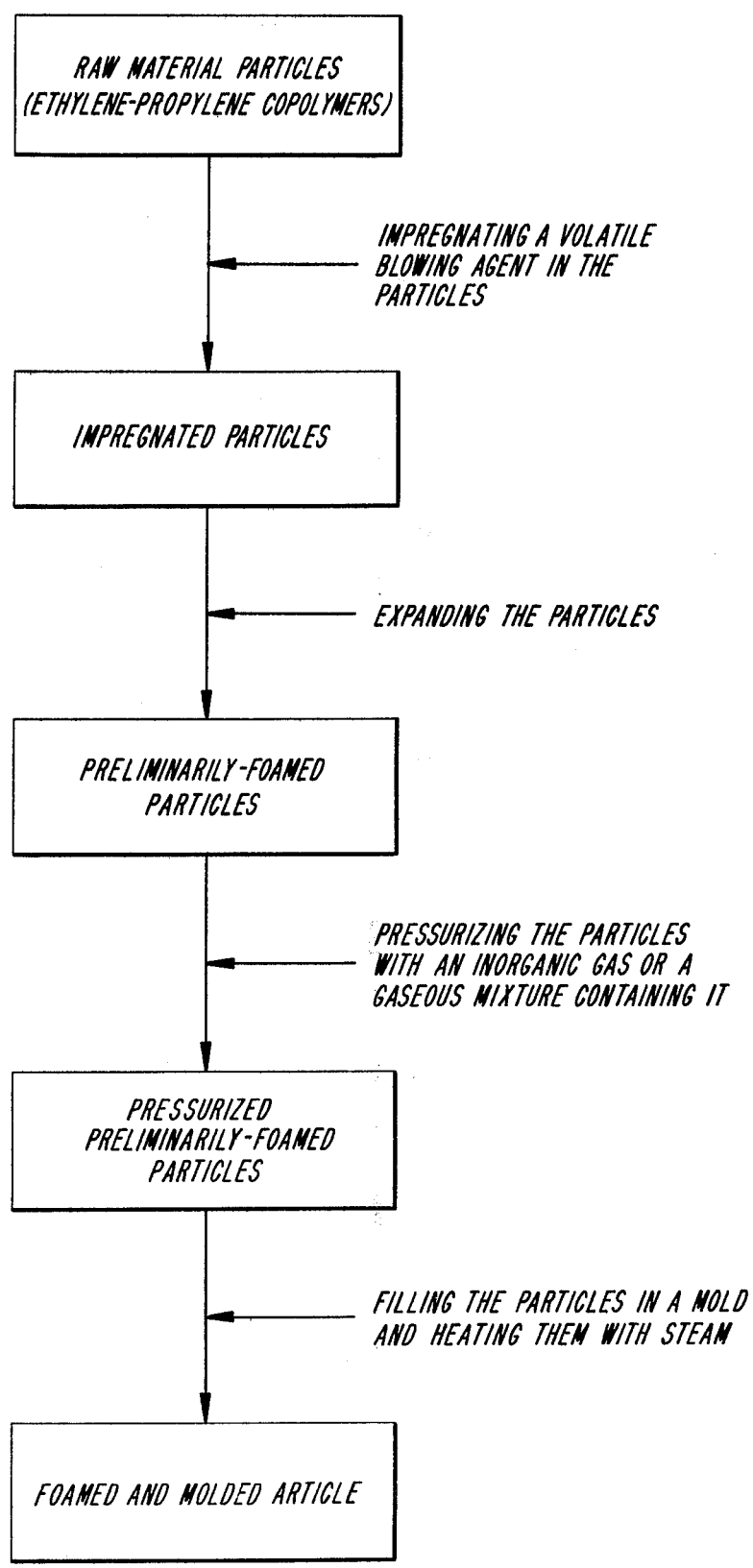

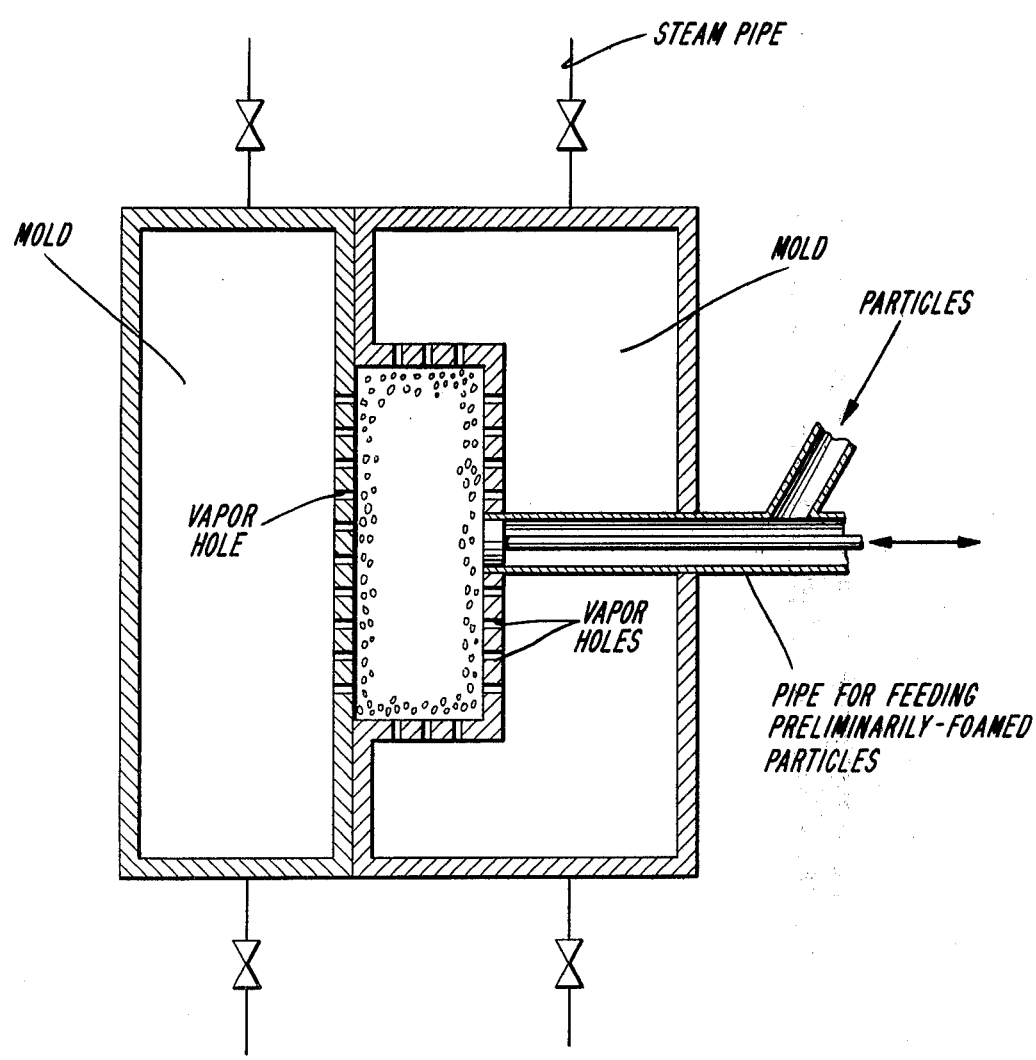

PROCESS FOR PRODUCING FOAMED AND MOLDED ARTICLE OF POLYPROPYLENE RESIN

This invention relates to a process for the production of a foamed and molded article of a polypropylene resin which exhibits excellent properties in heat resistance, chemical resistance, mechanical strength, etc.

Generally, polypropylene has excellent heat resistance and chemical resistance, high mechanical strength, better flexibility than polystyrene, and higher rigidity than polyethylene. In an attempt to introduce polypropylene having these excellent properties into the field of plastic foams, various investigations have been made on the method of producing polypropylene resin foams. However, foamed articles have not yet been obtained by a bead molding method although sheet-like foamed articles have been successfully produced by an extrusion molding method.

Foamed articles have previously been proposed in which the base resin is a polymer obtained by graft-polymerizing a vinyl aromatic monomer such as styrene onto polypropylene particles as a nucleus. These polypropylene foamed articles, however, do not have satisfactory heat resistance, chemical resistance and flexibility, and the properties of polypropylene are not utilized fully.

It is an object of this invention therefore to provide a foamed and molded article of polypropylene resin which is free from the aforesaid defects of the prior art, and which fully exhibits the properties of polypropylene resin.

In order to achieve this object, the present inventors have made extensive investigations. These investigations have now led to the discovery that a foamed and molded article of good quality can be obtained by selecting a specified ethylene/propylene copolymer as a base resin, preliminarily foaming particles of the base resin, aging the preliminarily-foamed particles, and then heating them in a mold.

Thus, according to this invention, there is provided a process for producing a foamed and molded article of a polypropylene resin, which comprises pressurizing preliminarily-foamed particles of an ethylene/propylene copolymer having a melt index value (measured in accordance with ASTM D 1238) of from 0.1 to 25, a latent heat of crystallization of not more than 28 cal/g and an ethylene content of 1 to 30% by weight as a base resin with an inorganic gas or a gaseous mixture of the inorganic gas and a volatile blowing agent thereby to impart an elevated pressure to the inside of said particles, thereafter filling said particles in a mold capable of enclosing the particles but allowing escape of gases therefrom, and then heating said particles to expand them to the configuration of the mold.

The invention will now be described in greater detail with the aid of the accompanying drawings in which FIG. 1 is a flow diagram of the invention process in block form;

FIG. 2 is a schematic cross-section view of a mold used in the process of this invention.

FIG. 1 shows the steps in the process of this invention, including the steps in preparing the preliminarily-foamed particles from the raw material of the ethylene/propylene copolymer used as the base resin.

Examples of the ethylene/propylene copolymer used as a base resin in this invention are an ethylene/propylene random copolymer, an ethylene/oropylene block copolymer, and a mixture of these.

The ethylene/propylene copolymer should have a melt index value of from 0.1 to 25, a latent heat of crystallization of not more than 28 cal/g, and an ethylene content of 1 to 30% by weight.

If the melt index value is less than 0.1, it is difficult to obtain a foamed article of a high expansion ratio by preliminary foaming. If it exceeds 25, an open-cellular structure tends to result during preliminary foaming and the foamed article is liable to shrink. Moreover, the mechanical strength of the final foamed and molded article is reduced.

If the latent heat of crystallization exceeds 28 cal/g, melt-adhesion of the preliminarily-foamed particles to each other is poor during molding. In the present invention, the latent heat of crystallization denotes latent heat generated during crystallization, and is measured by differential scanning calorimetry. Specifically, a test specimen of the resin is heated to 200° C. at a rate of 10° C./min. and then its temperature is lowered at a rate of 10° C./min. The amount of heat which is generated during temperature lowering is measured, and the latent heat of crystallization is determined.

If the ethylene content of the ethylene/propylene copolymer is less than 1% by weight, melt-adhesion of the preliminarily-foamed particles to each other is poor during molding. If it exceeds 30% by weight, the resulting copolymer does not show the properties ascribable to polypropylene, and a foamed molded article conforming to the configuration of a mold cannot be obtained. If the ethylene content is zero %, namely if a homopolymer of propylene is used, it is difficult to obtain preliminarily-foamed particles of a closed cellular structure and a high expansion ratio because of its high softening temperature, and during molding, the melt-adhesion of the resin particles is poor.

The ethylene/propylene copolymer used in this invention needs not always to be crosslinked, and is rather preferably non-crosslinked. Unexpectedly, the present inventors have found that the above-mentioned copolymer is foamed well even when it is non-crosslinked. In view of the general belief that a good foam cannot be obtained from a polypropylene resin unless it is crosslinked, it is surprising that in the present invention, a good foam can be obtained even from a non-crosslinked ethylene/propylene copolymer.

In one preferred embodiment of this invention, preliminarily-foamed particles are foamed by dispersing particles of the ethylene/propylene copolymer and a volatile blowing agent in water in the presence of a dispersing agent within a closed vessel, heating the dispersion to a temperature above the temperature at which the particles soften thereby to impregnate the volatile blowing agent in the particles, maintaining the pressure of the inside of the vessel at a predetermined value, opening one end of the vessel, and releasing the particles and water simultaneously into an atmosphere kept at a lower pressure than the vapor pressure of the volatile blowing agent in the vessel. Examples of the volatile blowing agent used in the preliminary foaming step include aliphatic hydrocarbons such as propane, butane, pentane, hexane and heptane; alicyclic hydrocarbons such as cyclobutane and cyclopentane; and halogenated hydrocarbons such as trichlorofluoromethane, dichlorodifluoromethane, dichlorotetrafluoroethane, methyl chloride, ethyl chloride and methylene chloride. The amount of the volatile blowing agent to be added varies depending upon its type and the desired degree of foaming. Usually, it is 10 to 40 parts by weight per 100 parts by weight of the ethylene/propylene copolymer. Finely divided aluminum oxide, titanium oxide, etc. can be used as the dispersing agent. The amount of the dispersing agent to be added is 0.04 to 2.0 parts by weight per 100 parts by weight of the ethylene/propylene copolymer.

In the preliminary foaming step, it is preferred that the copolymer particles be first heated to a temperature sufficient for the impregnation of the volatile blowing agent in the particles. The heating temperature may differ depending upon the type of the blowing agent, and is usually 70° to 150° C. The time required for impregnating the blowing agent in the particles is usually about 30 to about 60 minutes. Thereafter, the particles are heated to a temperature above the temperature at which they soften. The heating temperature is selected from temperatures which favorably lead to the foaming of the resin particles without breakage of the cells. It is usually 120° to 170° C.

The vapor pressure of the volatile blowing agent in the preliminary foaming step denotes that in a system in which the particles having the volatile blowing agent impregnated therein are dispersed in water. It, therefore, does not always agree with the vapor pressure of the volatile blowing agent existing alone. Thus, the vapor pressure of the volatile blowing agent varies depending upon the degree of affinity between the blowing agent and the resin particles, and the content and type of the blowing agent, and cannot be generalized. The atmosphere into which the particles containing the blowing agent and water are simultaneously released is kept at a lower pressure than the vapor pressure of the blowing agent in the vessel. Usually, it is an atmosphere at normal atmospheric pressure.

The preliminary foaming step can also be carried out by other methods, but in order to obtain a good foam of a high expansion ratio, the above-described method is most suitable. Furthermore, the above-described method of preliminary foaming is most advantageous for industrial practice.

The preliminarily-foamed particles obtained by the preliminary foaming step are then aged by applying pressure. In this step, the preliminarily-foamed particles are filled, for example, in a pressurizing tank, and an inorganic gas or a gaseous mixture of it with a volatile blowing agent is fed into the tank for pressurization. This step is usually carried out at room temperature, but if required under heat. The pressurizing time is properly selected depending upon the type of the inorganic gas or the gaseous mixture and the temperature. Usually, it is 10 to 70 hours. Application of pressures of at least 0.5 kg/cm$^2$.G is required. If the pressure is lower than 0.5 kg/cm$^2$.G, the finally obtained foamed molded article shrinks or shows poor melt-adhesion. The higher the pressure, the more the inorganic gas or the gaseous mixture can be incorporated in the preliminarily-foamed particles. Too high pressures, however, are not economically feasible, and usually the pressure is preferably in the range of 0.5 to 5 kg/cm$^2$.G. The pressure is selected depending upon the type of the inorganic gas or the gaseous mixture. Air, nitrogen, helium, neon, argon or mixture of these may be cited as examples of the inorganic gas. Air is most economical and is therefore preferred. The volatile blowing agent may be the same as those exemplified hereinabove with regard to the preliminary foaming step.

By this pressurizing step, the inorganic gas or the gaseous mixture of it with the volatile blowing agent penetrates into the preliminarily-foamed particles to apply a predetermined elevated gaseous pressure to the inside of the particles (to attain this state is referred to herein as aging). This internal pressure of the particles is a factor which determines the quality of a molded article to be obtained in the subsequent molding step. If the internal pressure of the particles is too low, the individual particles do not melt-adhere to each other and a good product cannot be obtained. Usually, after aging and immediately before molding, the internal pressure of the particles should be at least 0.5 kg/cm$^2$.G.

After the pressurizing step (aging), the preliminarily-foamed particles are withdrawn from the pressurizing tank into a hopper, for example. Then, the preliminarily foamed particles are filled in a mold capable of enclosing the particles but allowing escape of gases therefrom such as shown in FIG. 2, and heated. As a result, the particles are expanded and simultaneously, melt-adhesion occurs between the individual particles to give a molded article conforming to the configuration of the mold. Steam is a preferred heat source during molding, and usually pressurized steam under a pressure of 2 to 5 kg/cm$^2$.G is used.

After the molding, the molded article is cooled to a predetermined temperature, and withdrawn from the mold.

According to the process of this invention, an ethylene/propylene copolymer having a melt index value of 0.1 to 25, a latent heat of crystallization of not more than 28 cal/g and an ethylene content of 1 to 30% by weight is used as a base resin. As a result, preliminary foaming is easy, and melt-adhesion of the particles to each other is very easy in the molding step. Hence a good foamed molded article of a high expansion ratio can be obtained.

The process of this invention is a great innovation in that for the first time, it has provided a foamed and molded article of a polypropylene resin by the bead molding technique. According to the process of this invention, even a non-crosslinked ethylene/propylene copolymer having the above-mentioned properties can be foamed well. This brings about the advantage that the non-crosslinked ethylene/propylene copolymer can be re-utilized (a crosslinked one cannot be utilized again), and consequently, the yield of the product can be increased.

The foamed and molded article obtained by this invention can fully exhibit the properties of polypropylene, and has excellent heat resistance, chemical resistance and flexibility, and high mechanical strength. It can be widely used in various applications, for example as heat insulating and cushioning materials.

The following non-limitative examples illustrate the present invention more specifically.

EXAMPLES

A closed vessel was charged with 100 parts by weight of each of the polypropylene resins shown in Table 1, a predetermined amount of dichlorodifluoromethane (volatile blowing agent), 0.5 part by weight of aluminum oxide (dispersing agent) and 250 parts by weight of water. The resin particles were dispersed in water by stirring, and the temperature was raised to a predetermined temperature. The dispersion was maintained at this temperature for 0.5 hour. While maintaining the pressure of the inside of the vessel at about 30 kg/cm².G, one end of the vessel was opened, and the resin particles and water were released simultaneously into the outer atmosphere. They were dried to give preliminarily-foamed particles in various densities.

The preliminarily-foamed particles were placed in a pressurized vessel, and pressurized at room temperature for 48 hours under a pressure of 2 kg/cm².G using air or a gaseous mixture of air and dichlorodifluoromethane (see Table 2). The aged particles were filled in a mold and heated with steam under a pressure of 2 to 4 kg/cm².G to form a molded article.

The properties of the resulting molded article were measured, and the results are shown in Table 2. For information, the properties of commercially available foamed and molded articles of polyethylene and polystyrene respectively were measured, and the results are also shown in Table 2.

TABLE 1

| | | Base resin | | | Preliminarily-foamed particles | | |
|---|---|---|---|---|---|---|---|
| Run | Type of the resin | Ethylene content (wt. %) | Melt index value | Latent heat of crystallization (cal/g) | Amount of dichlorodifluoromethane (parts by weight) | Preliminary foaming temperature (°C.) | Bulk density (g/cm³) |
| Invention | | | | | | | |
| 1 | EP random copolymer | 2 | 0.1 | 23.1 | 20 | 145 | 0.020 |
| 2 | EP random copolymer | 2.9 | 13.5 | 19.3 | 18 | 140 | 0.024 |
| 3 | EP random copolymer | 4.1 | 7.8 | 20.1 | 18 | 139 | 0.018 |
| 4 | EP random copolymer | 10 | 1.3 | 17.5 | 18 | 120 | 0.026 |
| 5 | EP block copolymer | 14.5 | 22.3 | 27.4 | 18 | 155 | 0.021 |
| 6 | EP block copolymer | 23.7 | 3.5 | 24.5 | 17 | 154 | 0.023 |
| Comparison | | | | | | | |
| 1 | EP random copolymer | 3.5 | 0.05 | 17.8 | 18 | 138 | 0.063 |
| 2 | EP random copolymer | 3.3 | 26.8 | 17.5 | 20 | 140 | 0.019 |
| 3 | EP block copolymer | 32.5 | 5.5 | 25.3 | 18 | 153 | 0.021 |
| 4 | EP random copolymer | 0.3 | 6.5 | 23.4 | 20 | 152 | 0.022 |
| 5 | EP block copolymer | 5.5 | 4.6 | 28.5 | 20 | 160 | 0.023 |
| 6 | Propylene homopolymer | 0 | 3.0 | 23.0 | 20 | 165 | 0.035 |

Note:
EP = ethylene/propylene

TABLE 2

| | | Properties of the molded article | | | | |
|---|---|---|---|---|---|---|
| Run | Pressurizing gas | Appearance and state of melt-adhesion of the molded article | Density (g/cm³) | Compression hardness (kg/cm²) (*1) | Chemical resistance | Heat resistance (°C.) (*2) |
| Invention | | | | | | |
| 1 | Air | Good melt-adhesion | 0.021 | 1.0 | Good | 110 |
| 2 | Air | Good melt-adhesion | 0.025 | 0.95 | Good | 110 |
| 3 | Air | Good melt-adhesion | 0.019 | 0.75 | Good | 110 |
| 4 | Mixture of air and dichlorodifluoromethane (1:1 by mole) | Good melt-adhesion | 0.027 | 0.95 | Good | 110 |
| 5 | Mixture of air and dichlorodifluoromethane (1:1 by mole) | Good melt-adhesion | 0.022 | 0.80 | Good | 110 |
| 6 | Mixture of air and dichlorodifluoromethane (1:1 by mole) | Good melt-adhesion | 0.024 | 1.1 | Good | 110 |
| Comparison | | | | | | |
| 1 | Air | Poor melt-adhesion | 0.065 | 3.1 | Good | 110 |
| 2 | Air | Greatly shrunken | 0.030 | 1.0 | Good | 110 |
| 3 | Air | Greatly shrunken | 0.029 | 1.2 | Good | 110 |
| 4 | Mixture of | Poor | 0.023 | 0.92 | Good | 110 |

TABLE 2-continued

| Run | Pressurizing gas | Appearance and state of melt-adhesion of the molded article | Density (g/cm$^3$) | Compression hardness (kg/cm$^2$) (*1) | Chemical resistance | Heat resistance (°C.) (*2) |
|---|---|---|---|---|---|---|
| | air and dichlorodifluoromethane (1:1 by mole) | melt-adhesion | | | | |
| 5 | Mixture of air and dichlorodifluoromethane (1:1 by mole) | Poor melt-adhesion | 0.025 | 1.05 | Good | 110 |
| 6 | Mixture of air and dichlorodifluoromethane (1:1 by mole) | Not melt-adhered | — | — | — | — |
| Reference | | | | | | |
| 1 | Polyethylene foamed molded article | | 0.032 | 0.6 | Good | 80 |
| 2 | Polystyrene foamed molded article | | 0.033 | 2.7 | Poor | 80 |

(*1): Measured in accordance with JIS K-6767.
(*2): The temperature at which the molded article could be used.

What we claim is:

1. A process for producing a foamed and molded article of a polypropylene resin, which comprises pressurizing preliminarily-foamed particles of a non-cross-linked ethylene/propylene copolymer having a melt index value of from 0.1 to 25, a latent heat of crystallization of not more than 28 cal/g and an ethylene content of from 1 to 30% by weight as a base resin with an inorganic gas or a gaseous mixture of the inorganic gas and a volatile blowing agent whereby the inorganic gas or the gaseous mixture penetrates into said particles and impart an elevated pressure in the range of 0.5 to 5 kg/cm$^2$(G) to the inside of said particles, thereafter filling said particles in a perforated mold capable of enclosing the particles but allowing escape of gases therefrom, and then heating said particles with steam to expand them to the configuration of the mold.

2. The process of claim 1 wherein the ethylene/propylene copolymer is a random copolymer, a block copolymer, or a mixture of these.

* * * * *